US012415525B1

(12) United States Patent
Automata et al.

(10) Patent No.: US 12,415,525 B1
(45) Date of Patent: Sep. 16, 2025

(54) FAULT DIAGNOSIS FOR AUTONOMOUS VEHICLES

(71) Applicant: Zoox, Inc., Foster City, CA (US)

(72) Inventors: Lilith Rogue Automata, San Francisco, CA (US); Patrick Rice, San Francisco, CA (US); Jae Kyung Chong, Redwood City, CA (US); James Peter Gregory, Berkeley, CA (US); Maria Smirnoff, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 215 days.

(21) Appl. No.: 17/491,172

(22) Filed: Sep. 30, 2021

(51) Int. Cl.
*B60W 50/02* (2012.01)
*B60W 50/035* (2012.01)
*B60W 50/14* (2020.01)
*B60W 60/00* (2020.01)

(52) U.S. Cl.
CPC ...... *B60W 50/0205* (2013.01); *B60W 50/035* (2013.01); *B60W 50/14* (2013.01); *B60W 60/001* (2020.02); *B60W 60/0053* (2020.02); *B60W 2422/00* (2013.01); *B60W 2510/18* (2013.01); *B60W 2510/20* (2013.01); *B60W 2520/06* (2013.01)

(58) Field of Classification Search
CPC ......... B60W 2422/00; B60W 2510/18; B60W 2510/20; B60W 2520/06; B60W 50/0205; B60W 50/035; B60W 50/14; B60W 60/001; B60W 60/0053
See application file for complete search history.

(56) References Cited

U.S. PATENT DOCUMENTS

| | | | |
|---|---|---|---|
| 9,507,346 B1* | 11/2016 | Levinson | G05D 1/0291 |
| 2003/0163252 A1* | 8/2003 | Matsumoto | G05D 1/0274 |
| | | | 701/412 |
| 2009/0295559 A1* | 12/2009 | Howell | B60W 50/0205 |
| | | | 340/459 |
| 2010/0082199 A1* | 4/2010 | Ito | G07C 5/0816 |
| | | | 701/31.4 |
| 2012/0016547 A1* | 1/2012 | Aridome | B60L 58/14 |
| | | | 180/65.265 |
| 2017/0021828 A1* | 1/2017 | Seo | B60W 10/10 |
| 2017/0136842 A1* | 5/2017 | Anderson | A61B 5/4023 |
| 2017/0277183 A1* | 9/2017 | Takahashi | G05D 1/0246 |
| 2017/0291544 A1* | 10/2017 | Ishihara | G06F 3/013 |
| 2017/0297584 A1* | 10/2017 | Chen | B60T 8/1755 |
| 2018/0032082 A1* | 2/2018 | Shalev-Shwartz | G06N 3/044 |
| 2018/0050704 A1* | 2/2018 | Tascione | B60W 10/184 |
| 2018/0164813 A1* | 6/2018 | Poeppel | G07C 5/008 |
| 2018/0370540 A1* | 12/2018 | Yousuf | G06F 11/1487 |
| 2019/0079513 A1* | 3/2019 | Greenfield | G06F 11/2028 |
| 2019/0300007 A1* | 10/2019 | Hilligardt | B60W 50/029 |
| 2020/0023902 A1* | 1/2020 | Niewiadomski | B60D 1/06 |
| 2020/0043254 A1* | 2/2020 | Hase | B60W 40/02 |

(Continued)

*Primary Examiner* — Fadey S. Jabr
*Assistant Examiner* — Michael J Herrera
(74) *Attorney, Agent, or Firm* — Lee & Hayes, P.C.

(57) ABSTRACT

Vehicles may include a wide range of individual components and systems that work together to achieve advanced and high-performance states. A system correlates active faults arising among vehicle components to active constraints to determine what fault may be contributing to limited operations. In addition, an association between the active fault and active constraint may be presented to assist with diagnostics.

21 Claims, 6 Drawing Sheets

(56) References Cited

U.S. PATENT DOCUMENTS

| | | | | |
|---|---|---|---|---|
| 2020/0391757 A1* | 12/2020 | Kim | .................. | B60W 60/0055 |
| 2020/0398825 A1* | 12/2020 | Tsujino | .................. | G08G 1/143 |
| 2021/0016805 A1* | 1/2021 | Oba | .................. | B60W 60/0051 |
| 2021/0139017 A1* | 5/2021 | Sugano | .................. | G08G 1/149 |
| 2021/0174615 A1* | 6/2021 | Iijima | .................. | G07C 5/0841 |
| 2021/0331686 A1* | 10/2021 | Beyers | .............. | B60W 60/0053 |
| 2022/0289044 A1* | 9/2022 | Downs, Jr. | .............. | B60L 3/003 |

\* cited by examiner

FAULT DIAGNOSIS FOR AUTONOMOUS VEHICLES

BACKGROUND

Vehicles include a wide range of components and systems. For example, vehicles can include, among other things, drive systems (e.g., motor, gear assembly, steering assembly, suspension assembly, etc.); power systems (e.g., one or more batteries, power electronics, charging components, etc.); body systems (e.g., doors, frame, etc.); heating and cooling (e.g., HVAC); perception systems (e.g., sensors, lidar, cameras, radar, etc.); autonomous (AI) computing stacks; and the like. Collectively, these systems may include many component parts (e.g., hundreds, thousands, etc.), and in many instances, these component parts can work in combination to execute or accomplish operational states or parameters. For example, one or more of these systems (and the component subparts) may operate to achieve power states (e.g., high voltage, low voltage or accessory, standby, etc.); control states or levels of automation (e.g., manual (no automation), semi-autonomous, fully autonomous, etc.); drive states (e.g., bidirectionality, front-wheel steering, four-wheel steering, etc.); and performance states (e.g., maximum speed, maximum grade, etc.). In some instances, one or more faults may arise among component parts and systems, which can constrain operations of a vehicle. For example, a fault in drive system may constrain the performance state of the vehicle. However, with the vast number of components that may contribute to an operation, it can be challenging to determine what fault may be contributing to a constrained operation or state of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
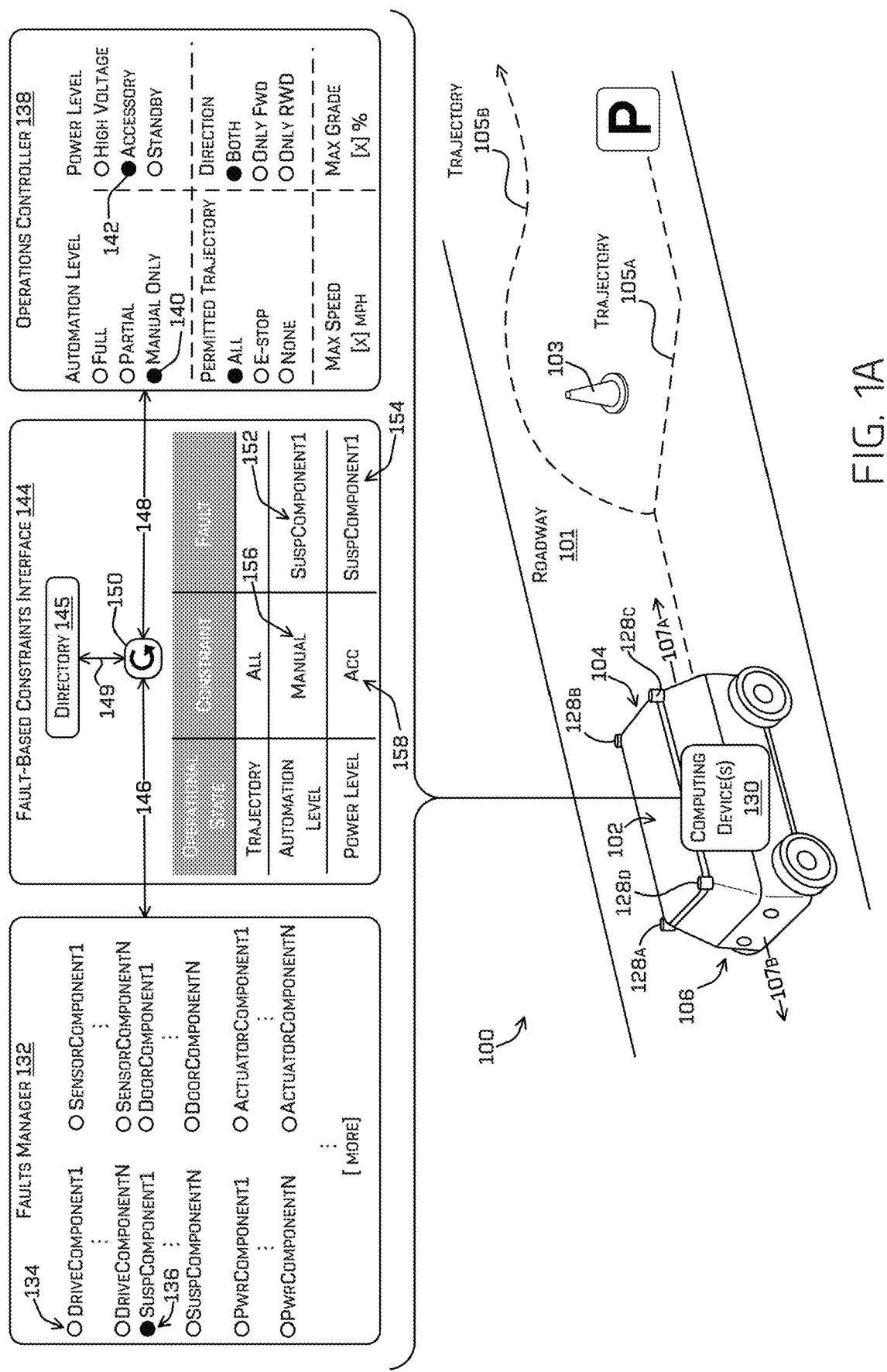
FIG. 1A depicts an environment including a vehicle with various computing devices, in accordance with one or more examples of this disclosure.

As discussed above, vehicles may include a wide range of individual components and systems. Autonomous vehicles, in particular, may include thousands of components that work together in complex systems to achieve advanced and high-performance states. Considering that a fault associated with just a single component (of the hundreds or thousands) can constrain the vehicle (e.g., limit trajectories, prevent autonomous mode, restrict speeds, limit power, etc.), determining which fault(s) and which component(s) to address and in what order can be a challenging and time consuming task. In addition, many (e.g., tens, hundreds, etc.) of faults may be coming in during a given time, which can present a large amount of information for a diagnostician to process. The present disclosure is directed to a system that correlates faults arising among vehicle components to constrained states to determine what fault(s) may be contributing to limited operation(s). In additional examples, the present disclosure may determine interrelations and/or hierarchy of the faults and/or components (e.g., which fault(s) and/or component(s) are dependent on, and may be caused by, which other fault(s) and/or component(s)). In further examples, the present disclosure may present (e.g., via a graphical user interface (GUI)) an indication of the fault(s) in association with an indication of the constraint to improve an operator's ability to quickly diagnose issues. In some examples, the GUI may also include an indication of the interrelations and/or may indicate or be useful in diagnosing a root cause of one or more faults. Among other things, these aspects of the disclosure may significantly accelerate diagnostic workflows and contribute to more quickly removing undesired constraints that can limit vehicle operations. In addition, examples of the present disclosure may reduce the amount of time during which a computing device or system (e.g., autonomous vehicle) may be constrained to limited operations. That is, examples of the present disclosure may increase the rate at which components of an autonomous vehicle can return to full operation.

An autonomous vehicle may include a variety of systems, any number of which includes subsystems and components. For example, a vehicle may include one or more drive assemblies, and a drive assembly may include an electric motor, gear assembly, axle(s), steering components, suspension assembly, wheels, brakes, and the like. The drive assembly may receive signals from one or more control systems, including an autonomous-driving computing stack, a remote control interface (e.g., from a teleoperations system, service technician, etc.), and/or in the case of a manually driven vehicle manual actuators (e.g., gas pedal, brake pedal, etc.). In at least some examples, the autonomous-driving computing stack may include a perception system (e.g., for detecting or sensing an environment in which the vehicle is positioned); a localization component (e.g., for determining a relative or dead-reckoned position of the vehicle and/or a positive relative to a map); a planning component (e.g., for generating trajectories that, when traversed by the vehicle, maneuver the vehicle through the environment); or any other autonomous driving components, including any additional components described with respect to FIG. 4.

In addition, a vehicle may include a power system having one or more power storage units (e.g., high voltage batteries, low voltage batteries, fuel cells, capacitors, etc.) and power electronics (e.g., inverter(s), switches, etc.). In some examples, the vehicle may include a charging assembly, including components (e.g., onboard coil, DC fast charge receiver, DC contacts, etc.) for coupling to an offboard power supply. Moreover, the vehicle may include one or more body systems, such as doors, panels, windshield(s), and other exterior fascia, along with associated motors, actuators, and controllers to operate such body systems. In some examples, a vehicle may include one or more sensor systems, including various sensors such as inertial measurement units (IMUs), lidar sensors, radar sensors, cameras, time-of-flight (TOF) sensors, global positioning sensors (GPS), etc. Vehicles may also include heating and cooling systems (HVAC) for managing cabin air conditions (e.g., temperature, humidity, etc.), as well as thermal management systems (e.g., radiator system) for managing temperatures of motor components, computing devises, the power system, and the like. In some examples, a vehicle may include various user interface (UI) systems for presenting and receiving signals (e.g., graphical user interfaces or GUIs which may be presented on one or more touch or non-touch displays or projectors, voice recognition system, speaker(s) or speaker array(s), microphone(s), light or LED-based interfaces, etc.). A vehicle may also include any additional components described with respect to FIG. 4, including one or more computing devices or communication connections. This description of systems or assemblies is not meant to necessarily create black and white distinctions between categories. For example, a power system including a battery may be considered part of a drive system and/or a charging system, and microphones may be considered part of a sensor system and/or a user interface system.

When operating as intended, components and systems of a vehicle can combine to enable the vehicle to achieve fully operational states. However, when a fault arises in a component, the fault may limit the vehicle to a constrained operational state. As a non-limiting example, a fault in a suspension system may impact a power mode (e.g., since vehicle charging may be affected) and/or automation levels (e.g., since a perception system may be affected). A fault may indicate various information with respect to a given component, and in general, a fault indicates that the component may not be operating in an intended manner or is at risk for not operating in an intended manner. For example, faults may arise from, among other things, component degradation over time, component damage from external conditions or elements, positional changes or shifts, abnormal electric current, poor signal connection or transmission, outdated software or firmware, and the like. Faults may be detected based on one or more sensors associated with a component, such as, but not limited to, voltage sensors, current sensors, pressure sensors, and temperature sensors. In some examples, faults may be detected by one or more techniques described in U.S. patent application Ser. No. 16/856,597 (filed Apr. 23, 2020, and titled "Vehicle Health Monitor"); U.S. patent application Ser. No. 17/113,879 (filed Dec. 7, 2020, and titled "Performance-Based Metrics for Evaluating System Quality"); and U.S. patent application Ser. No. 17/246,048 (filed Apr. 30, 2021, and titled "Methods and Systems to Assess Vehicle Capabilities"), which are incorporated herein by reference in their entirety for all intents and purposes. In at least some examples, faults may be determined via a software-based monitor. For example, faults may be determined by comparing, for example, measured values vs expected values (e.g., of speed). That is, faults may be deduced when the vehicle does not perform in an expected manner. Furthermore, faults may arise in one or more components of a vehicle under various contexts. For example, a fault may occur while a vehicle is performing driving operations, autonomously and/or manually. In addition, a fault may occur and/or be detected when one or more test signals are sent to a component, such as when vehicle readiness is being verified during startup procedures.

In at least some examples of the present disclosure, firmware associated with a component may define one or more faults associated with the component. That is, the firmware may define what conditions constitute a fault, as well as what constraints should be applied to vehicle operational states in the event of a fault. As such, a fault may, at least in part, contribute to or trigger a vehicle being limited in one or more respects, such that the vehicle is inoperable or operates in a constrained state. For example, a set of components (e.g., in the drive assembly and in the autonomous computing stack), when operating as intended, may contribute to the vehicle executing in a fully autonomous operational state (e.g., the automation level is fully autonomous). However, a fault in a single component may result in the automation level of the vehicle being constrained, such that the vehicle may be limited to only certain types of autonomous driving operations, to only manual driving operations, or to no driving operations. An automation level is one example of an operational state, and a vehicle may include various other operational states. For example, a vehicle may include an available trajectory operational state, and when components operate as intended, an unconstrained vehicle may be permitted to plan trajectories within a full or "unconstrained" range of trajectories available to the vehicle. However, a fault in a component may result in a constraint being applied to the vehicle, such that the vehicle may be limited to executing only certain types of trajectories (e.g., limited steering angles, emergency stops) or to not executing any trajectories. In some examples, an operational state (e.g., whether trajectories are constrained or limited based on one or more system or sub-system conditions) is based on one or more techniques described in U.S. patent application Ser. No. 16/539,893 (filed Aug. 13, 2019, and titled "Modifying Limits on Vehicle Dynamics for Trajectories"), which is incorporated herein by reference in its entirety for all intents and purposes. Other examples of operational states may include, but are not limited to, a driving direction (e.g., unconstrained allowing fully bidirectional and constrained limiting to driving in only one direction); a max power mode (e.g., unconstrained allowing for high voltage power and constrained limiting the vehicle to accessory power, standby power, or no power); a max speed; a max braking rate; and a max driving grade.

In examples of the present disclosure, an autonomous vehicle is a highly complex system of components. For example, a single component can contribute to multiple operational states, and achieving an operational state can rely on many components (e.g., hundreds or thousands). Moreover, at a given time, many (e.g., tens, hundreds, etc.) faults may be received and/or currently active. As such, when a vehicle is in a constrained state, absent aspects of the present disclosure, it can be challenging to determine what fault may be causing the constrained state. For example, while some conventional systems may monitor faults arising from one or more components, these systems often store the faults among all component states (e.g., both faulted component states and non-faulted component states). That is, a log or other data storage of the faults may include a mix of both the faults and the components that are not in a fault state. As such, it can be cumbersome and time consuming to manually search the log to identify the fault states. Furthermore, even when a fault state is identifiable from among the log, there may not be any indication of what constraint the fault state may have evoked. In addition, although some conventional techniques may automatically apply constraints to a vehicle when a fault is detected (e.g., based on firmware definitions associated with the fault), these conventional approaches often do not provide a correlation between the constraint and the fault available for inspection. That is, although these systems may provide some indication of the constraint, these systems often do not provide a mechanism for an automotive diagnostician to easily determine what fault caused the limited vehicle operations.

In contrast to conventional approaches, at least some examples of the present disclosure receive (e.g., consume, poll, etc.) both the active faults and the active constraints associated with a vehicle. That is, the present techniques may receive a list of the active faults on the vehicle, as well as a list of active constraints being imposed on the vehicle. In addition, the present techniques may access a directory of associations between faults and constraints (e.g., based on the firmware definitions of the faults) to determine which constraints are listed in association with which faults. In some examples, once the constraints are determined from the directory, the present disclosure may match the constraints to the active constraints to determine the corresponding active fault. In at least some examples, techniques described herein may present an indication of the active fault in association with the active constraint, such that an automotive diagnostician (or other operator) may easily and quickly determine which fault caused the constraint and should be addressed to restore the vehicle to an unrestrained operational state.

In some instances, one or more active faults may be identified as a potential cause of an active constraint. As such, the one or more active faults may be presented together with the active constraint to help a diagnostician quickly see which faults to address. In some examples, the present disclosure may prioritize faults based on one or more criteria. For example, the present disclosure may determine, and prioritize a fault based on, a hierarchy and/or interrelationship between components and/or faults. For example, if a first component provides an input to a second component, and both components are in a fault state, the first component may be prioritized over the second component. Prioritization may, among other things, enable diagnosis of a root cause or help establish an order in which faults may be addressed. Other prioritization criteria may include timing, such as which fault was detected first, or fault severity, such as based on a predetermined ranking, on a number of downstream components affected by a fault, or on a number of active constraints associated with the fault). In some instances, fault timing and/or severity may be based on one or more techniques described in U.S. patent application Ser. No. 16/225,997 (filed Dec. 19, 2018, and titled "Safe System Operation Using Latency Determinations") or U.S. patent application Ser. No. 16/226,275 (filed Dec. 19, 2018, and titled "Transition to Safe State Based on Age/Integrity of Critical Messages"), which are incorporated herein by reference in their entirety for all intents and purposes. In some instances, the present disclosure may present faults (e.g., in a GUI) in a manner that facilitates prioritized fault resolution, includes an indication of the interrelations, and/or may indicate or be useful in diagnosing a root cause of one or more faults.

The techniques described herein can be implemented in a number of ways to improve automotive diagnostics workflows and efficiency. As described, examples of the present disclosure can reduce the amount of time during which a device or system (e.g., autonomous vehicle) may be constrained to a limited operational state (e.g., reduce downtime). In addition, examples may contribute to earlier detection of root faults, which may reduce a likelihood of downstream issues with safety and degraded computing performance. Furthermore, when examples of the present disclosure are performed at startup (e.g., when preparing to initiate drive operations), the system may more quickly be online in an operational state. Moreover, with more accurate fault detection and identification, the system may be able to more intelligently limit only some operations, as opposed to limiting all operations. Examples are provided below with reference to FIGS. 1A, 1B, 1C, 2, 3, and 4. Examples are discussed in the context of autonomous vehicles; however, the methods, apparatuses, and components described herein can be applied to a variety of components (e.g., other robotic applications), and are not limited to autonomous vehicles. In one example, the techniques described herein may be utilized in driver-controlled vehicles. Furthermore, the techniques described herein can be used with real data (e.g., captured using sensor(s)), simulated data (e.g., generated by a simulator), or any combination of the two.

Referring to FIG. 1A, FIG. 1A depicts an environment 100 in which an autonomous vehicle 102 is maneuvering (or could maneuver). For example, the autonomous vehicle 102 may be traversing along a roadway 101 and may encounter one or more obstacles 103. In some examples, operations of the autonomous vehicle 102 may enable the autonomous vehicle 102 to detect the obstacles 103, as well as generate, and select between, multiple trajectories 105a and 105b.

As indicated above, the vehicle 102 may include various components and systems that contribute to operations of the vehicle (e.g., when operating in the environment 100). Among other things, the vehicle 102 includes a front end 104 and a rear end 106. In one example, the vehicle 102 is a bidirectional vehicle having a first drive module positioned in the front end 104 and a second drive module positioned in the rear end 106. As used herein, a bidirectional vehicle is one that is configured to switch between traveling in a first direction of the vehicle (as indicated by the directional arrow 107a) and a second, opposite, direction of the vehicle (as indicated by the directional arrow 107b). In other words, there is no fixed "front" or "rear" of the vehicle 102. Rather, whichever longitudinal end of the vehicle 102 is leading at the time becomes the "front" and the trailing longitudinal end becomes the "rear." In other examples, the techniques described herein may be applied to vehicles other than bidirectional vehicles.

A drive module may include various components. Also, whether or not the vehicle is bidirectional, the first drive module (in the front end 104) and second drive module (in the rear end 106) may be different from one another. For example, one drive module may have a subset of the features and/or differing of the other drive module. In one such example, the first drive module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In various instances, the wheels positioned in the front end 104 are steerable, and the wheels positioned in the rear end 106 are also steerable, such that the vehicle 102 includes four-wheel steering (e.g., including the sets of wheels having the respective steering components). In other examples, the drive modules may have one or more distinct or mutually exclusive vehicle systems (e.g., one drive module has an HVAC system and the other drive module has a drive motor). As another non-limiting example of such, one module may have a first HVAC system while the other drive module has a second HVAC system that is different from the first HVAC system.

Figure 1B:
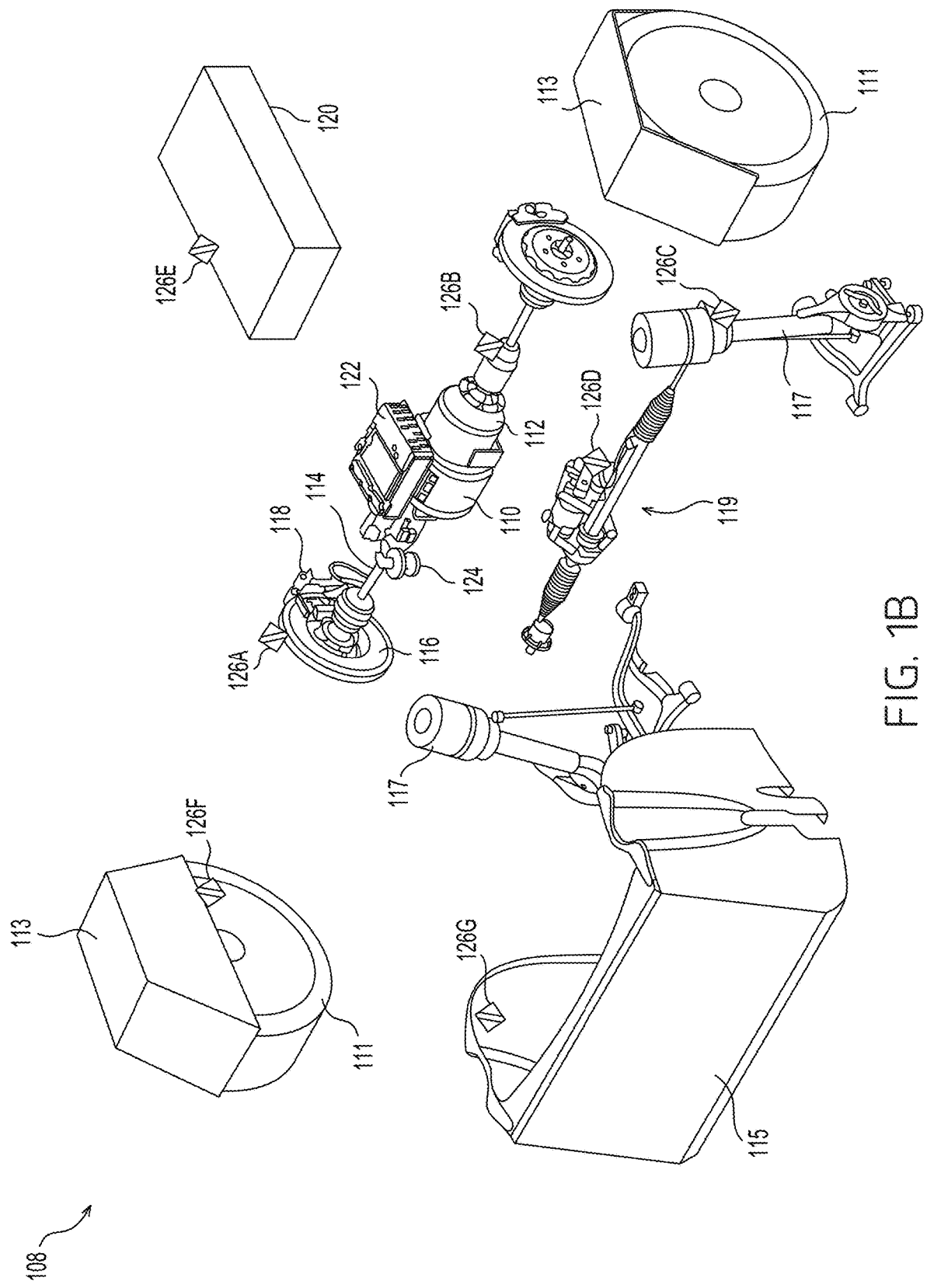
FIG. 1B depicts components of a vehicle, in accordance with one or more examples of this disclosure.

Referring to FIG. 1B, an exploded view of a portion 108 of the vehicle 102 is depicted. The portion 108 in FIG. 1B may be positioned in the front end 104 and/or the rear end 106 of the vehicle. In some examples, the portion 108 in FIG. 1B may include a module, such as a drive module, which may be removably attachable to a body to form portions of the vehicle 102. The drive module 108 may include a drive motor 110, a gear box 112, and axles 114. In addition, the drive module 108 may include a braking system, including rotor disks 116 and calipers 118. Also depicted in FIG. 1B is a power system, including a battery 120 and an inverter 122, which may be considered part of the drive module in some instances, but may also be a separate assembly. In addition, FIG. 1B depicts a coolant pump 124.

In at least some examples of the present disclosure, the portion 108 includes two of the wheels 111 and one or more body panels, which include fenders 113 associated with the wheels 111 and an end fascia 115. The end fascia 115 and/or the body panels may generally comprise portions of the body of the vehicle 102. The portion 108 can also include one or more suspension systems or assemblies 117, which may include shocks, struts, active suspension components, control arms, or the like. In the example of FIG. 1B, one of the suspension systems 117 may be associated with a respective one of the wheels 111, although in other implementations, the portion 108 may include a single suspension system, e.g., associated with more than one (both) of the wheels 111. In some examples, the suspension system 117 may include a Macpherson-style suspension assembly. A steering system 119 (e.g., steering motor, pinion, rack, etc.) is also illustrated in FIG. 1B.

In additional implementations, the portion 108 may include computing systems, electrical systems, sensor systems, cooling systems, and/or other systems for controlling aspects of a vehicle including the portion 108. Moreover, and as will be evident to those having ordinary skill in the art, the portion 108 may also include harnesses, controls reservoirs, hydraulic lines, valves, pumps, and/or other components not illustrated. Although not illustrated in FIG. 1B, the vehicle 102 may include a variety of other components, which may operate in conjunction with the drive module 108. For example, the vehicle 102 may include a charging assembly, including components (e.g., onboard coil, DC fast charge receiver, DC contacts, etc.) for coupling to an offboard power supply. In at least some examples, the vehicle may include a contact-based charging system, as described in U.S. patent application Ser. No. 16/214,826 (filed Dec. 10, 2018, and titled "Charge Coupler and Method for Autonomously Charging Vehicle Batteries"), which is incorporated herein by reference in its entirety for all intents and purposes. For example, the vehicle 102 may include an adjustable suspension system configured to lower the vehicle for charging operations. In further examples, a vehicle may include various user interface (UI) systems for presenting and receiving signals (e.g., graphical user interface or GUI, voice recognition interface/exchange, speakers, microphones, light or LED-based interfaces, etc.).

In at least some examples, one or more of the components of the vehicle 102 may include a sensor (and/or other means for diagnosis) for detecting a fault in the component. For example, sensors 126a-g may be arranged throughout the drive module 108 to detect faults among the components associated with the drive module 108. For example, a sensor 126a may be associated with the braking system; a sensor 126b may be associated with the motor or gear box; a sensor 126c may be associated with the suspension assembly 117; a sensor 126d may be associated with the steering system 119; a sensor 126e may be associated with the battery 120; sensors 126f may be associated with the wheels 111; and sensors 126g may be associated with fascia or other body components. In other examples, fault sensors may be associated with any of the components or systems described with respect to the vehicle 102. For instance, fault sensors may be arranged throughout the vehicle, on the interior, exterior, undercarriage, etc. In examples the fault sensors may detect faults based on various types of electric signals (e.g., voltage, current, etc.). In addition, components of the vehicle 102 may be associated with firmware that may define one or more faults associated with the components. In some examples, sensors may include a software-based monitor. In additional or alternative examples, faults may be deduced based on, for example, expected operating parameters as compared with determined operating parameters. As a non-limiting example of such, a vehicle heading may be determined based on localization and subsequently compared with the desired yaw to determine the likelihood of a fault in one or more of the steering, planning, or localization components and/or subcomponents. For the sake of simplicity, it should be understood that wherever sensors are described herein, one or more of sensors, fault indicators, or other fault diagnostics may be used.

Referring to FIG. 1A, the vehicle 102 may include various sensors for detecting one or more different conditions. For example, the vehicle 102 may include sensors 128a-128d (e.g., FIG. 1A), any of which may include a perception sensor for capturing data of an environment around the vehicle 102 (e.g., lidar, camera, time-of-flight, sonar, radar, etc.). These sensors 128a-128d may be used for various operations, such as object detection, route planning, localization, etc. In at least one example, the vehicle 102 may also include a yaw rate sensor, such as an inertial measurement unit (IMU), gyroscope, or other sensor for measuring a yaw rate of the vehicle 102. In a further example, the vehicle 102 may include one or more sensors (e.g., wheel encoders) for measuring a wheel speed of a respective wheel. Furthermore, the vehicle 102 may include location sensors, such as GPS. These are just some examples of sensors, and the vehicle may include other sensors, such as those described with respect to the system 400. In addition, the placement of the sensors relative to the vehicle 102 in FIG. 1A is an example, and in other examples, the sensors may be arranged at other positions on the vehicle 102. The vehicle 102 may include other components. For example, the vehicle 102 may include one or more actuators for controlling the vehicle, such as a throttle or gas pedal, brake pedal, remote control, and the like. In addition, the vehicle may include one or more computing devices for autonomously controlling one or more operations of the vehicle 102, such as those components described with respect to the vehicle 402 in FIG. 4. In examples, the sensors 128a-128d, as well as other components of the vehicle may also be associated with fault sensors.

In some examples, components of the vehicle 102 are associated with firmware that may define one or more faults associated with the components. That is, the firmware may define what conditions constitute a fault, as well as what constraints should be applied to vehicle operational states in the event of a fault. In addition, the vehicle 102 may include one or more components (e.g., software components) that monitor fault states across the vehicle 102. For example, the vehicle 102 includes one or more computing devices 130 including a faults manager 132, which may connect to the components via one or more networks (e.g., Controller Area Network (CAN) bus, ethernet, etc.). Among other things, the faults manager 132 may track the fault states associated with components and systems of the vehicle 102. That is, in some examples, the faults manager 132 may monitor a state of components in the vehicle subject to fault states or conditions, such that the faults manager 132 may track which components are in a fully operational (non-fault) state and which components include a fault state.

As depicted in FIG. 1A, the faults manager 132 may store data indicating a state associated with a component, including whether the component is in a fault state (e.g., as illustrated by a filled circle icon 136) or a non-fault state (e.g., as illustrated by an unfilled circle icon 134). The depiction of the states provided in FIG. 1A is for explanatory purposes to illustrate what the data stored and updated by the faults manager may indicate, and is not necessarily meant to convey the actual data (e.g., how the data might be visually presented). For example, the faults manager 132 stores states associated with components of the drive assembly or drive module (e.g., DriveComponent1 . . . . DriveComponentN); components of the suspension assembly (e.g., SuspComponent1 . . . . SuspComponentN); components of the power assembly (e.g., PwrComponent1 . . . . PwrComponentN); components of the sensor system (e.g., SensorComponent1 . . . . SensorComponentN); components of the door assemblies (e.g., DoorComponent1 . . . . DoorComponentN); and components of the vehicle actuators (e.g., ActuatorComponent1 . . . . ActuatorComponentN). These are examples of some components for which the faults manager 132 may monitor a fault status, and the faults manager 132 may store states associated with many additional components (e.g., 100's or 1000's of components). The depiction of the states provided in FIG. 1A is for explanatory purposes to illustrate what the data stored and updated by the faults manager may indicate, and is not necessarily meant to convey an appearance of the actual data (e.g., how the data might be visually presented).

As indicated above, firmware associated with the components may define what constraints should be applied to vehicle operational states when a fault state occurs. As such, a fault may, at least in part, contribute to or trigger a vehicle being limited in one or more respects, such that the vehicle operates in a constrained state. In some examples, an operations controller 138 may, based on one or more faults, impose a limitation or constraint on an operation of the vehicle 102. For example, FIG. 1A illustrates various operational states that may be managed by the operations controller 138, including (but not limited to) an automation level (e.g., fully autonomous or "full," partially autonomous or "partial," or "manual only"); permissible trajectories (e.g., "all" indicating both 105a and 105b are permissible, emergency stop or "e-stop" indicating only trajectory 105a is permissible, or "none" indicating no trajectories are permissible); driving direction (e.g., "both" indicating 107a and 107b, "only fwd" indicating only 107a, and "only rwd" indicating only 107b); max power or power level (e.g., "high voltage," "accessory," or "standby"); max speed (e.g., a specified percentage of a maximum speed of the vehicle 102); and max driving grade (e.g., a percentage of a maximum grade which the vehicle 102 may traverse). For any of the operational states, the operations controller 138 may apply limitations and may store data indicating whether any active constraints are currently imposed. For example, in FIG. 1A, the operations controller 138 may store data indicating (e.g., as illustrated by the filled circle 140) that the automation level is constrained to manual operations only (e.g., an unconstrained state would include fully autonomous) and indicating (e.g., as illustrated by the filled circle 142) the power level is constrained to accessory power (e.g., where an unconstrained state would include high voltage power). The depiction of the constraints provided in FIG. 1A is for explanatory purposes to illustrate what the data stored and updated by the operations controller 138 may indicate, and is not necessarily meant to convey an appearance of the actual data (e.g., how the data might be visually presented).

Figure 1C:
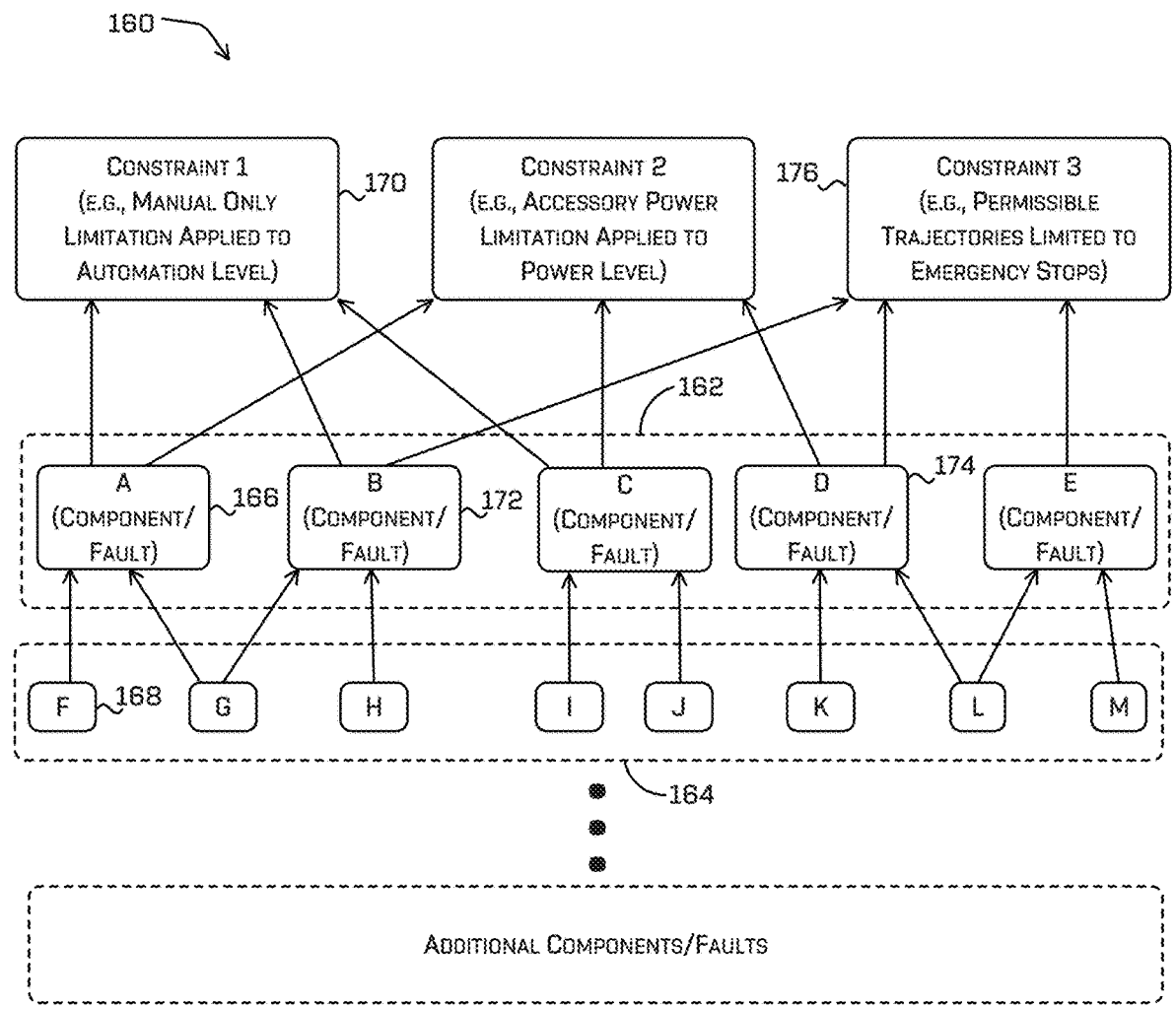
FIG. 1C depicts an example fault hierarchy, in accordance with one or more examples of this disclosure.

As described above, the vehicle 102 is a highly complex system of components. In some instances, a single component can contribute to multiple operational states, and achieving an operational state can rely on many components (e.g., hundreds or thousands). For example, referring to FIG. 1C, an example diagram 160 of a hierarchy and interrelationships between components/faults and constraints is depicted, and the elements depicted in FIG. 1C may be a small subset of the total elements (e.g., components, faults, and constraints) in the vehicle 102. The diagram in FIG. 1C illustrates that in some instances, a hierarchy of components/faults may exist. For example, the Level 1 components/faults 162 may represent system level elements (e.g., a system of sub-components), whereas the Level 2 components/faults 164 may represent elements that are sub-components of, or provide input to, the higher Level 1 elements.

In FIG. 1C, the diagram 160 illustrates that two or more faults (if both active at the same time) may be linked to the same constraint. For example, a fault at node F 166 may be active, which may also trigger a fault at node A 178—both faults being potential triggers of the "Constraint 1" 170. In another example, a fault at node B 172 and a fault at node D 174 may both be active—both faults being potential triggers of the "Constraint 3" 176. As such, when the vehicle 102 is in a constrained state, absent aspects of the present disclosure, it can be challenging to determine what fault may be causing the constrained state. For example, the automation level of the vehicle 102 may be constrained to manual only and/or the power level may be constrained to accessory mode, and aspects of the present disclosure can provide an improved workflow to diagnose what fault may be causing the constraint(s) (e.g., a root cause) and/or suggest an order in which to address faults.

In at least some examples of the present disclosure, a fault-based constraints interface 144 provides an interface to, and between, the faults manager 132 and the operations controller 138. In some examples, the fault-based constraints interface 144 may maintain and access the firmware definitions associated with faults. For example, the fault-based constraints interface 144 may maintain (or access) a directory 145 (or library, lookup table, etc.) of faults, and the directory 145 may include constraints associated with (e.g., caused by) faults, as well as information describing the hierarchical structure of, and/or interrelationships between, the vehicle components/faults. For example, the fault-based constraints interface 144 may store (or access) data representing the they type of hierarchy and relationships graphically represented by the diagram 160 in FIG. 1C. In other examples, the directory 145 may include a list of constraints that are ranked based on restrictiveness. That is, the directory may include a list of constraints that are imposable on the vehicle, as well as data describing how restrictive a constraint is compared to other constraints affecting the same operational state. For example, with respect to the automation level operational state, the directory 145 may include information indicating that "manual only" is more restrictive than "partial" (e.g., the amount of limitations applied to the automation level operational state is more restrictive).

In at least some examples, the fault-based constraints interface 144 may include a machine-learned model trained to predict or associate one or more faults associated with a constraint. For example, the model may be trained with training data include constraints labeled with ground truth faults. Furthermore, in some examples, sample data may include many (e.g. hundreds of, thousands of, millions of, etc.) example constraints with the fault(s) deemed to have caused the constraints, and the most common fault(s) associated with a given constraint may be determined and referenced to determine a most-likely fault.

In at least some examples, the fault-based constraints interface 144 receives (e.g., consumes, polls, etc.) both the active faults (e.g., from the faults manager 132) and the active constraints (e.g., from the operations controller 138) associated with a vehicle 102. In at least some examples, the fault-based constraints interface 144 receives 146 a list of the active faults on the vehicle, as well as receives 148 a list of active constraints being imposed on the vehicle. In addition, the fault-based constraints interface 144 accesses 149 the firmware definitions of the active faults to determine which constraints are associated with which faults. Furthermore, once the associations are identified (e.g., from the directory), the fault-based constraints interface 144 may match 150 the associated constraints to the active constraints to determine the corresponding active fault. In at least some examples, the fault-based constraints interface 144 may present an indication of the active fault (e.g., "SuspComponent1" 152 and/or "SuspComponent1" 154) in association with the active constraint (e.g., "Manual" 156 and/or "ACC" 158), such that an automotive diagnostician (or other operator) may easily and quickly determine which fault caused the constraint and should be addressed to restore the vehicle to an unrestrained operational state.

In examples, the faults manager 132, the operations controller 138, and the fault-based constraints interface 144 may include one or more computing devices 130. In some examples, the faults manager 132, the operations controller 138, and the fault-based constraints interface 144 may reside on computing devices of the vehicle 102 or on remote computing devices. One or more of the faults manager 132, the operations controller 138, and the fault-based constraints interface 144 may be executed on an external computer that communicates with computing devices and/or components of the vehicle 102. For example, the faults manager 132 and the operations controller 138 may reside on computing devices of the vehicle, whereas the fault-based constraints interface 144 may reside on an external computer that attaches (e.g., via a wired and/or wireless connection) to a network of the vehicle 102 (e.g., CAN bus, ethernet, Bluetooth, LTE, etc.) to perform diagnostic-related operations.

In examples of the present disclosure, the fault-based constraints interface 144 may provide correlations between active faults and active constraints in various contexts. For example, the fault-based constraints interface 144 may provide correlations when a vehicle is in-use (e.g., executing driving operations on a roadway), during testing procedures (e.g., when test signals requesting various operations are submitted to the vehicle 102), upon startup (e.g., verifying readiness to perform driving operations), or during maintenance and repair.

In addition, the fault-based constraints interface 144 may significantly improve diagnostic procedures related to unique faults and constraints associated with the vehicle 102. For example, as explained above, the vehicle 102 may be highly complex, such that various interplays may exist between many different components and operational states or constraints. In some instances, the fault-based constraints interface 144 may receive multiple active faults that concurrently limit a same operational state by different amounts. For example, one active fault may limit an automation level to include partial automation, whereas another active fault may more restrictively limit the automation level to manual only. In examples of this disclosure, when the fault-based constraints interface 144 receives multiple active faults that concurrently limit a same operational state by different amounts, the fault-based constraints interface 144 may default to presenting an indication of the more restrictive constraint and correlated active fault (e.g., based on information in the directory 145 indicating such relative levels of restrictiveness).

In at least some examples, the fault-based constraints interface 144 may determine that two or more faults are associated with an active constraint. As such, the fault-based constraints interface 144 may determine which of the faults may be a root cause and/or which of the faults to address first. In some examples, the fault-based constraints interface 144 may apply one or more fault prioritization criteria, such as a level in a faults hierarchy (e.g., based on information in the directory 145), a time at which a fault was detected (e.g., prioritizing older faults), and/or a fault severity level (e.g., based on a number of constraints potentially evoked by a fault). In some examples, the fault-based constraints interface 144 may prioritize a fault based on a component that provides an input to another faulted component (e.g., where the node F 168 provides input to the node A 166 the node F 168 may be prioritized and/or identified as a root cause). As such, correlations may exist that may not be readily apparent from conventional techniques, and examples of the present disclosure improve diagnostics with respect to some of these more unique systems.

In some instances, two or more faults may be identified as potentially contributing to a constraint. Examples of the present disclosure may indicate (e.g., in a GUI) the two more faults. In some examples, the present disclosure may determine which fault is more likely to have caused the constraint. For instance, fault-prioritization criteria may be weighted, such that a fault meeting a higher weighted criteria is deemed more likely to have contributed to the constraint. In addition or alternatively, examples may determine a likelihood or confidence value associated with a determination that a fault is more likely to have caused a constraint. In some examples, a likelihood or confidence value may be determined for one or more faults.

For example, the vehicle 102 may include a perception system (e.g., including the sensors 126a-126d) that performs operations based on a non-faulted state of the suspension assembly. For instance, based on a non-faulted state of the suspension assembly, sensors 128a-128d may be calibrated and a field of view determined. However, if a component of the suspension assembly is in a fault state, indicating the vehicle 102 may be rolled, pitched, or banked, the calibration and field-of-view may be negatively affected. As such, based on the fault state associated with the suspension assembly, a constraint may be imposed on the automation level (e.g., manual only), since autonomous operations may rely on the perception system. Without examples of the present disclosure (e.g., the fault-based constraints interface 144) it may be challenging to determine that the constraint on the automation level was imposed based on a fault in a suspension assembly component. However, as explained above, the fault-based constraints interface 144 may receive 146 the fault associated with the suspension assembly and receive 148 the active constraint associated with the automation level and, based on the fault-based constraints provided in the firmware, match the fault to the constraint. In addition, the fault-based constraints interface 144 presents the indication 152 of the fault in association with the indication of the constraint 156 to improve the speed and ease of diagnostics.

In addition to the example provided above with respect to the relationship between the suspension assembly and the perception system, the vehicle 102 may include other complex relationships between component faults and constraints that can be more easily diagnosed with techniques described herein. For example, as described above, a charging system of the vehicle 102 may rely on an active suspension system of the vehicle 102, such as where the active suspension system lowers the vehicle 102 to engage a contact-based charger. As such, if a component of the suspension assembly is in a fault state, the charging operations may be negatively affected. As such, based on the fault state associated with the suspension assembly, a constraint may be imposed on the power level (e.g., ACC or standby), to reduce the likelihood of depleting a battery state and needing to charge before the suspension assembly can be fixed. In this example, the suspension component associated with a fault state may be the same suspension component described in the above example (associated with the indication 152), or the suspension component may be a different component of the suspension assembly. Without examples of the present disclosure (e.g., the fault-based constraints interface 144) it may be challenging to determine that the constraint on the power level was imposed based on a fault in a suspension assembly component. However, as explained above, the fault-based constraints interface 144 may receive 146 the fault associated with the suspension assembly and receive 148 the active constraint associated with the power level and, based on the fault-based constraints provided in the firmware, match the fault to the constraint. In addition, the fault-based constraints interface 144 may presents the indication 154 of the fault in association with the indication of the constraint 158 to improve the speed and ease of diagnostics.

Figure 2:
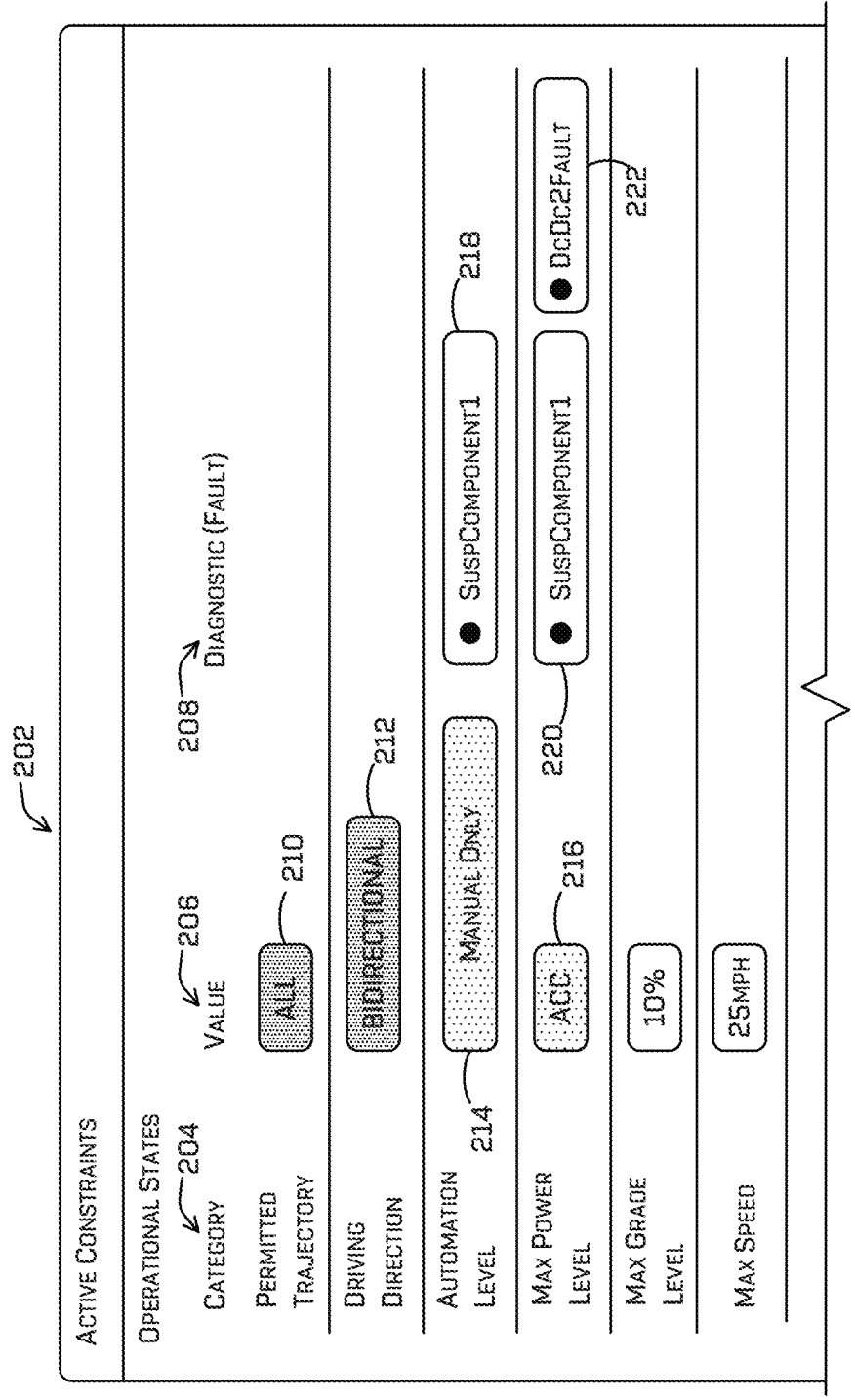
FIG. 2 depicts an example graphical user interface for presenting an association between one or more active faults and one or more active constraints, in accordance with one or more examples of this disclosure.

Referring now to FIG. 2, an example graphical user interface (GUI) 202 is depicted that may be presented by the fault-based constraints interface 144. The GUI 202 includes a first column 204 identifying types of operational states of the vehicle 102, a second column 206 including indications of one or more constraints associated with the operational state(s), and a third column 208 including indications of any faults correlated to the active constraints in the second column 206. For example, in column 204, the GUI 202 includes indications of the "permitted trajectory" operational state, the "driving direction" operational state, the "automation level" operational state, the "max power level" operational state, etc. In addition, in association with these categories of operational states (e.g., in the same row), the GUI presents an indication of any constraints that may be imposed. In some examples, the indication of a constraint (or lack of a constraint) may include a textual description of the state. For example, "ALL" 210 or "BIDIRECTIONAL" 212 may indicate a fully operational state, whereas "Manual Only" 214 or "ACC" 216 may indicate respective constraints. In some examples, the indication of a constraint (or lack of a constraint) may include a color associated with an indication. For example, the unconstrained operational states may include indications 210 and 212 (e.g., values) in the column 206 depicted in one color (e.g., green or other color depicted with one density of stipple), whereas the constrained operational states may include indications 214 and 216 (e.g., values) in the column 206 depicted in a different color (e.g., yellow or other color indicating a warning or heightened importance as depicted with a different density of stipple). In addition, the GUI 202 presents, in association with the indication of the active constraint (e.g., in a same row), an indication of an active fault determined correlated or matched to the active constraint.

For example, an indication 218 of an active fault matched to the "Manual Only" constraint is presented in association with the indication 214, and an indication 220 of an active fault matched to the "ACC" constraint is presented in association with the indication 216.

As indicated, in some instances, multiple active faults may be determined that are associated with a constraint. For example, in FIG. 2, the indication 214 for the "Manual Only" constraint is presented in association with the indication 218 for an active fault (SuspComponent1). In some examples, the fault-based constraints interface 144 may have determined other faults in addition to "SuspComponent1" and applied fault prioritization criteria to determine the SuspComponent1 is ranked highest (e.g., as a highest priority, root cause, etc.). In some examples, the faults-based constraints interface 144 may determine multiple faults associated with a constraint, and the multiple faults may be presented. For example, as depicted in FIG. 2, multiple fault indicators 220 and 222 may be presented in association with the indication 216, indicating to a diagnostician that multiple faults may need to be addressed to remove the "ACC" constraint (e.g., need to address both SuspComponent1 and DcDc2Fault).

In examples of the present disclosure, by matching active constraints to active faults and presenting associated indications, the fault-based constraints interface 144, including the GUI 202, may improve workflows associated with diagnosing what faults should be addressed to remove constraints and enable the vehicle 102 to achieve unlimited operational states. In addition, quicker diagnosis afforded by the present examples can reduce the amount of time during which a device or system (e.g., autonomous vehicle) may be constrained to a limited operational state (e.g., reduce downtime). Furthermore, the faster diagnosis (e.g., as contributed to by the GUI) may allow for earlier detection of root faults, which may reduce a likelihood of downstream issues with safety and degraded computing performance. Furthermore, when examples of the present disclosure are performed at startup (e.g., when preparing to initiate drive operations), the system may more quickly transition online in an operational state. Moreover, with more accurate fault detection and identification, the system may be able to more intelligently limit only some operations, as opposed to limiting all operations (e.g., only limit Max Power Level functional state and not all functional states).

Figure 3:
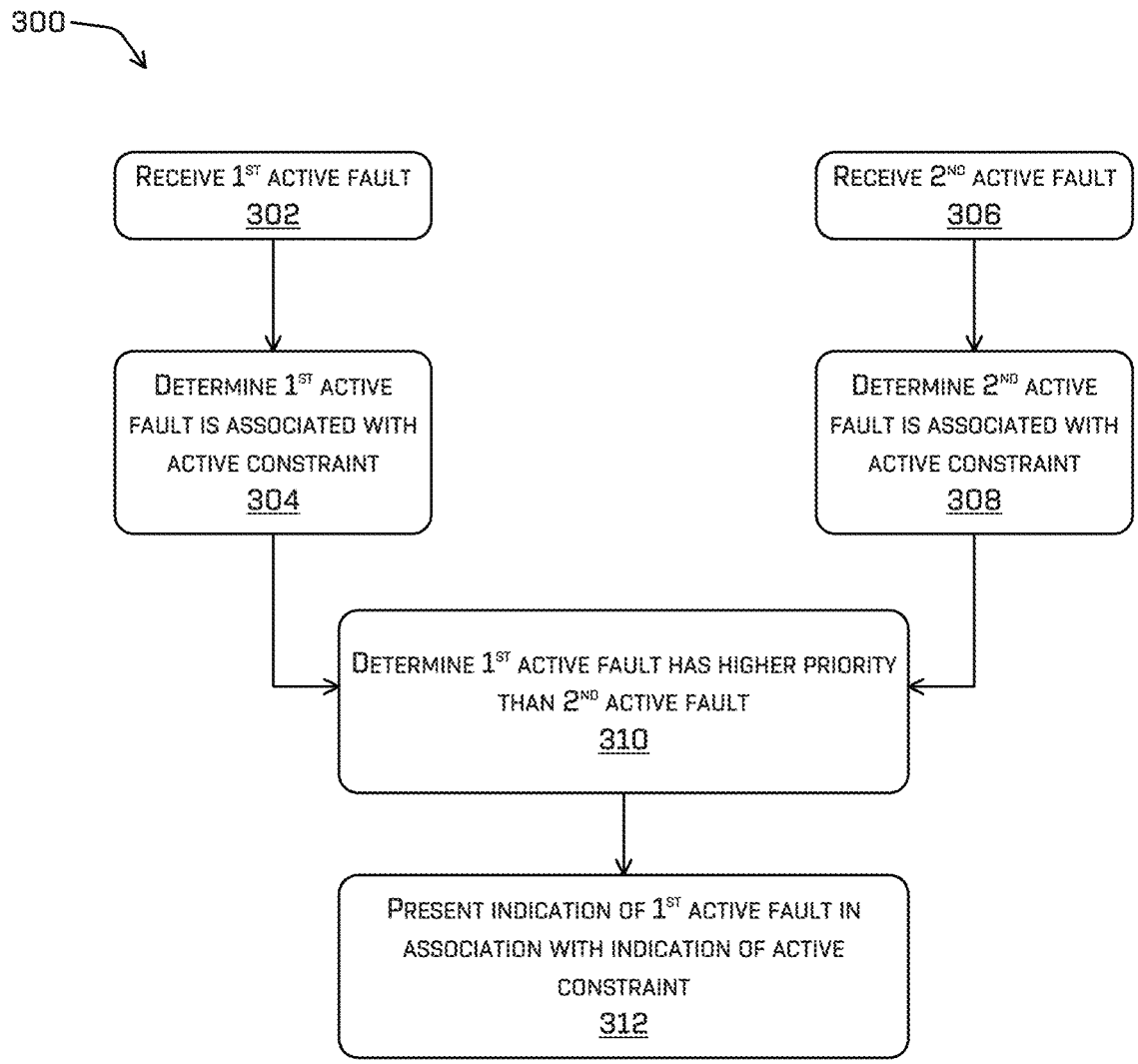
FIG. 3 is a flowchart illustrating an example method, in accordance with one or more examples of this disclosure.

Referring to FIG. 3, FIG. 3 includes a flowchart showing an example related to determining, and presenting, an association between an active fault and an active constraint. The method illustrated in FIG. 3 is described with reference to one or more of the elements shown in FIGS. 1A, 1B, 1C, and/or 2 for convenience and ease of understanding. However, the method illustrated in FIG. 3 is not limited to being performed using these elements and may be implemented using any of the other vehicles, computing devices, computing systems, and/or other elements described in this application, as well vehicles, computing devices, computing systems, and/or other elements other than those described herein. Moreover, the elements (e.g., vehicles, computing devices, computing systems, etc.) described herein are not limited to performing the method illustrated in FIG. 3.

FIG. 3 is a flowchart illustrating an example method 300 for determining, and presenting, an association between an active fault and an active constraint. At operation 302, the method 300 includes receiving (or determining) a first active fault. For example, the fault-based constraints interface 144 may receive (e.g., consume, poll, receive pushed data, etc.)

information from the faults manager 132 indicating the first active fault associated with a first component or system.

At operation 304, the method 300 includes determining the first active fault is associated with an active constraint. For example, the fault-based constraints interface 144 may receive information from the operations controller 138 indicating an active constraint (e.g., some constraint that limits an operational state of the vehicle, such as automation level, power level, permissible trajectories, etc.). In addition, the fault-based constraints interface 144 may look up the first active fault and/or the active constraint in the directory 145 (e.g., which includes associations (e.g., based on firmware) between faults and constraints) and correlate the first active fault to the active constraint.

The method 300 includes, at operation 306, receiving (or determining) a second active fault. For example, the fault-based constraints interface 144 may receive (e.g., consume, poll, receive pushed data, etc.) information from the faults manager 132 indicating the second active fault in association with a second component or system.

At operation 308, the method 300 includes determining the second active fault is associated with the active constraint (e.g., the same active constraint determined to be associated with the first active fault). For example, similar to step 304, the fault-based constraints interface 144 may receive (or have already received) information from the operations controller 138 indicating the active constraint, and the fault-based constraints interface 144 may look up the second active fault and/or the active constraint in the directory 145 (e.g., which includes associations (e.g., based on firmware) between faults and constraints) and correlate the second active fault to the active constraint.

Operation 310 includes, determining (e.g., based on a fault prioritization criterion) that the first active fault has higher priority than the second active fault. For example, the fault-based constraints interface 144 may refer to the directory 145 or other information indicating the hierarchy and/or interrelationships between faults/components. In some examples, the fault-based constraints interface 144 may determine the first active fault has higher priority than the second active fault based on a component associated with the first active fault providing input to a second component associated with the second active fault. In some examples, prioritization may be based on a time at which the first active fault is detected (e.g., if the first active fault is detected before the second active fault). In some examples, the fault prioritization criterion may include a relative position in the fault hierarchy (e.g., being in Level 2 as opposed to Level 1); a severity level associated with the first active fault (e.g., based on a predetermined severity level stored in the directory 145); or a quantity of active constraints associated with the first active fault (e.g., where one active fault is associated with more active constraints than another active fault).

The method 300 includes, at operation 312, presenting an indication of the first active fault in association with an indication of the active constraint. For example, indications may be presented in a GUI, such as the GUI 202 depicted in FIG. 2. The indication of the first active fault may include a textual description of fault. In some examples, the indication of the first active fault may include a color (e.g., yellow or red) to quickly indicate to a diagnostician that an operation of the vehicle is limited.

The method 300 described above is illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the method 300 may be combined in whole or in part with other methods.

The various techniques described herein may be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 4:
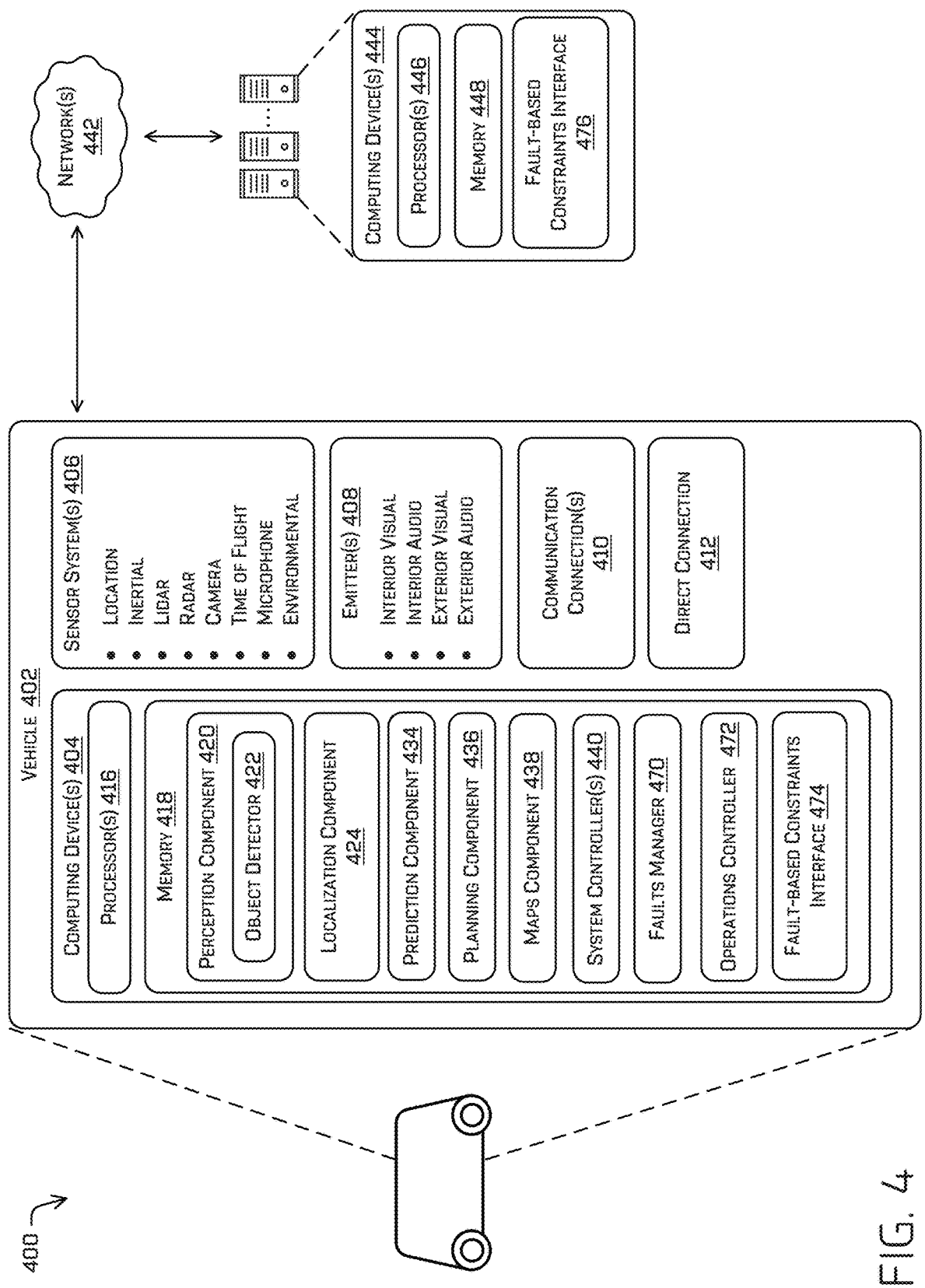
FIG. 4 is a block diagram of an example system for implementing the techniques described herein.

Referring now to FIG. 4, FIG. 4 depicts a block diagram of an example system 400 for implementing the techniques described herein. In at least one example, the system 400 can include a vehicle 402. In the illustrated example system 400, the vehicle 402 is an autonomous vehicle; however, the vehicle 402 can be any other type of vehicle. The vehicle 402 may be the vehicle 102 depicted in FIG. 1 and may be configured to perform various operations that determine, and present, associations between active faults and active constraints.

The vehicle 402 can be a driverless vehicle, such as an autonomous vehicle configured to operate according to a Level 4 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 402 can be configured to control all functions from start to completion of the trip, including all parking functions, it may not include a driver and/or controls for driving the vehicle 402, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 402 can include one or more computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle 402 to exchange data and/or to provide power), and one or more drive system(s) 414. The one or more sensor system(s) 406 can be configured to capture sensor data associated with an environment.

The one or more sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, ball joint sensors, chassis position sensors, etc. The one or more sensor system(s) 406 can include multiple instances of each of these or other types of sensors. For instance, the time-of-flight sensors can include individual time-of-flight sensors located at the corners, front, back, sides, and/or top of the vehicle 402. As another example, the camera sensors can include multiple cameras disposed at various locations about the exterior and/or interior of the vehicle 402. The one or more sensor system(s) 406 can provide input to the computing device 404.

The vehicle 402 can also include one or more emitter(s) 408 for emitting light and/or sound. The one or more emitter(s) 408 in this example include interior audio and visual emitters to communicate with passengers of the vehicle 402. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 402 can also include one or more communication connection(s) 410 that enable communication between the vehicle 402 and one or more other local or remote computing device(s) (e.g., charging station, a remote teleoperation computing device, etc.) or remote services. For instance, the one or more communication connection(s) 410 can facilitate communication with other local computing device(s) on the vehicle 402 and/or the one or more drive system(s) 414. Also, the one or more communication connection(s) 410 can allow the vehicle 402 to communicate with other nearby computing device(s) (e.g., other nearby vehicles, traffic signals, etc.).

The one or more communications connection(s) 410 can include physical and/or logical interfaces for connecting the computing device 404 to another computing device or one or more external networks 442 (e.g., the Internet). For example, the one or more communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 4G, etc.), satellite communication, dedicated short-range communications (DSRC), or any suitable wired or wireless communications protocol that enables the respective computing device to interface with the other computing device(s).

In at least one example, the vehicle 402 can include one or more drive system(s) 414. In some examples, the vehicle 402 can have a single drive system 414. In at least one example, if the vehicle 402 has multiple drive systems 414, individual drive systems 414 can be positioned on opposite ends of the vehicle 402 (e.g., the front and the rear, etc.). In at least one example, the drive system(s) 414 can include one or more sensor system(s) 406 to detect conditions of the drive system(s) 414 and/or the surroundings of the vehicle 402. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle 402 (e.g., sensor system(s) 406).

The drive system(s) 414 can include many of the vehicle systems, including a high voltage battery, battery charging components, a motor to propel the vehicle, power electronics, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more components to perform various functionalities of the drive system(s) 414. Furthermore, the drive system(s) 414 also include one or more communication connection(s) that enable communication by the respective drive system with one or more other local or remote computing device(s).

The computing device 404 can include one or more processor(s) 416 and memory 418 communicatively coupled with the one or more processor(s) 416. In the illustrated example, the memory 418 of the computing device 404 stores a perception component 420, a localization component 424, a prediction component 434, a planning component 436, a maps component 438, and one or more system controller(s) 440. In addition, the memory 418 may store a faults manager 470, an operations controller 472, and a fault-based constraints interface 474. Though depicted as residing in the memory 418 for illustrative purposes, it is contemplated that the perception component 420, the localization component 424, the prediction component 434, the planning component 436, the maps component 438, and the one or more system controller(s) 440 can additionally, or alternatively, be accessible to the computing device 404 (e.g., stored in a different component of vehicle 402) and/or be accessible to the vehicle 402 (e.g., stored remotely).

The perception component 420 can include functionality to perform object detection, segmentation, and/or classification. In some examples, the perception component 420 and/or the object detector 422 can provide processed sensor data that indicates a presence of an entity that is proximate to the vehicle 402 and/or a classification of the entity as an entity type (e.g., car, pedestrian, cyclist, building, tree, road surface, curb, sidewalk, unknown, etc.). In additional and/or alternative examples, the perception component 420 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

Further, the perception component 420 can include functionality to store perception data generated by the perception component 420. In some instances, the perception component 420 can determine a track corresponding to an object that has been classified as an object type. For purposes of illustration only, the perception component 420, using sensor system(s) 406 can capture one or more images of an environment, which may be used to determine information about an environment.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 422 can detect (among other things) semantic objects represented by sensor data. In some examples, the object detector 422 can identify such semantic objects and can determine a two-dimensional or a three-dimensional bounding box associated with the object. The object detector 422 can determine additional information such as a location, orientation, pose, and/or size (e.g., length, width, height, etc.) associated with the object. The object detector 422 can send data to other components of the system 400 for localization and/or determining calibration information, as discussed herein.

The localization component 424 can include functionality to receive data from the sensor system(s) 406 and/or other components to determine a position of the vehicle 402. For example, the localization component 424 can include and/or request/receive a three-dimensional map of an environment and can continuously determine a location of the autonomous vehicle within the map. In some instances, the localization component 424 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 424 can provide data to various components of the vehicle 402 to determine an initial position of an autonomous vehicle for generating a trajectory or for initial calibration.

The prediction component 434 can generate one or more probability maps representing prediction probabilities of possible locations of one or more objects in an environment. For example, the prediction component 434 can generate one or more probability maps for vehicles, pedestrians, animals, and the like within a threshold distance from the vehicle 402. In some instances, the prediction component 434 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 436 can determine a path for the vehicle 402 to follow to traverse through an environment. For example, the planning component 436 can determine various routes and paths and various levels of detail. In some instances, the planning component 436 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 436 can generate an instruction for guiding the autonomous vehicle along at least a portion of the route from the first location to the second location. In at least one example, the planning component 436 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 436 can alternatively, or additionally, use data from the perception component 420 and/or the prediction component 434 to determine a path for the vehicle 402 to follow to traverse through an environment. For example, the planning component 436 can receive data from the perception component 420 and/or the prediction component 434 regarding objects associated with an environment. Using this data, the planning component 436 can determine a route to travel from a first location (e.g., a current location) to a second location (e.g., a target location) to avoid objects in an environment. In at least some examples, such a planning component 436 may determine there is no such collision free path and, in turn, provide a path which brings vehicle 402 to a safe stop avoiding all collisions and/or otherwise mitigating damage.

The memory 418 can further include one or more maps associated with a maps component 438 that can be used by the vehicle 402 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps from the map(s) component 438 can include at least one map (e.g., images and/or a mesh). In some examples, the vehicle 402 can be controlled based at least in part on the map(s) component 438. That is, the map(s) component 438 can be used in connection with the perception component 420 (and subcomponents), the localization component 424 (and subcomponents), the prediction component 434, and/or the planning component 436 to determine a location of the vehicle 402, identify objects in an environment, generate prediction probabilit(ies) associated with objects and/or the vehicle 402, and/or generate routes and/or trajectories to navigate within an environment.

In at least one example, the computing device 404 can include one or more system controller(s) 440, which can be configured to control steering, propulsion, braking, safety, emitters, communication, and other systems of the vehicle 402. These system controller(s) 440 can communicate with and/or control corresponding systems of the drive system(s) 414 and/or other components of the vehicle 402, which may be configured to operate in accordance with a path provided from the planning component 436.

The computing device 404 can also, in some examples, include a faults manager 470 (e.g., faults manager 132), which may track a fault or non-fault state associated with the other components and/or systems of the vehicle 402 (e.g., those systems and components described above). In addition, the computing device 404 may include an operations controller 472 that may impose various limitations on vehicle systems and components based on active faults. Further, the computing device 404 may include a fault-based constraints interface 474, which determines and presents associations between active faults (e.g., consumed from the faults manager 470) and active constraints (e.g., consumed from the operations controller 472).

The vehicle 402 can connect to computing device(s) 444 via network 442, and the computing device(s) may include one or more processor(s) 446 and memory 448 communicatively coupled with the one or more processor(s) 446. In at least one instance, the one or more processor(s) 446 can be similar to the processor(s) 416 and the memory 448 can be similar to the memory 418. In at least one example, the computing device(s) 444 may include a remote diagnostic tool configured to diagnose faults and constraints associated with the vehicle 402. For example, the computing device(s) 444 may include a fault-based constraints interface 476 that can provide an interface to, and between, the faults manager 470 and the operations controller 472.

The processor(s) 416 of the computing device 404 and the processor(s) 446 of the computing device(s) 444 can be any suitable processor capable of executing instructions to process data and perform operations as described herein. By way of example and not limitation, the processor(s) 416 and 446 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 418 computing device 404 and the memory 448 of the computing device(s) 444 are examples of non-transitory computer-readable media. The memory 418 and 448 can store an operating system and one or more software applications, instructions, programs, and/or data to implement the methods described herein and the functions attributed to the various systems. In various implementations, the memory 418 and 448 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 418 and 448 can be implemented as a neural network. In some examples a machine learned model could be trained for object detection or trajectory planning for parking in position to align coils. In some examples, a model could be trained to detect faults or to predict which faults are associated with which active constraints. For example, the model may be trained with training data include constraints labeled with ground truth faults. Furthermore, in some examples, sample data may include many (e.g. hundreds of, thousands of, millions of, etc.) example constraints with the fault(s) deemed to have caused the constraints, and the most common fault(s) associated with a given constraint may be determined and referenced to determine a most-likely fault.

As described herein, an exemplary neural network is a biologically inspired algorithm which passes input data through a series of connected layers to produce an output. Any layers in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet40, ResNet101, VGG, DenseNet, PointNet, and the like.

As described above with reference to FIGS. 1-4, techniques described herein can be useful for determining, and presenting, an association between an active fault and an active constraint These techniques may, among other things, assist an automotive diagnostician with navigating the complex systems of a vehicle to determine what components or systems may need to be addressed when trying to enable a vehicle to operate in an unconstrained state without limitations.

EXAMPLE CLAUSES

A: An autonomous vehicle comprising: a first sensor associated with a first component, which provides a first output; a second sensor associated with a second component, wherein a second output of the second component is based at least in part on the first output; one or more processors; and one or more computer-readable media storing instructions that, when executed by the one or more processors, cause the autonomous vehicle to perform operations comprising: determining a first active fault associated with the first component; determining a second active fault associated with the second component; receiving data indicating an active constraint which restricts a level of operation associated with the autonomous vehicle; determining that the active constraint is associated with the first active fault and with the second active fault; determining, based at least in part on the second output being based on the first output, that the first active fault is a root cause of the active constraint; and presenting, via a graphical user interface (GUI) and based on the first active fault being the root cause, an indication of the active constraint in association with an indication of the first active fault.

B: The autonomous vehicle of paragraph A, wherein: the active constraint is a first active constraint; and the operations further comprise: receiving second data indicating a second active constraint that restricts the level of operation; and determining the first active constraint is more restrictive than the second active constraint, wherein, based on the first active constraint being more restrictive, the indication of the first active constraint is presented, instead of an indication of the second active constraint.

C: The autonomous vehicle of either paragraph A or B, wherein: the active constraint is a first active constraint, which restricts a level of automation, and the indication of the first active fault is a first indication of the first active fault; and the operations further comprise: receiving second data indicating a second active constraint that restricts a maximum power mode executable by the autonomous vehicle; determining, based at least in part on associations between faults and constraints, that the first active fault is associated with the second active constraint; and presenting, via the graphical user interface, an indication of the second active constraint in association with a second indication of the first active fault.

D: The autonomous vehicle of any one of paragraphs A-C, wherein: the first component includes a suspension component, the second component includes a perception component, and the active constraint limits the autonomous vehicle to manual operations.

E: The autonomous vehicle of any one of paragraphs A-D, wherein: the active constraint restricts a level of automation of the autonomous vehicle; and the operations further comprise presenting, via the GUI, an indication of a second active constraint associated with at least one of a permitted trajectory, a driving direction, a max power level, a max grade, or a max speed.

F: A method comprising: receiving first data indicating a first active fault associated with a first component of a system; receiving second data indicating a second active fault associated with a second component of the system; receiving third data indicating an active constraint, which limits an operational state of the system; determining, based on the first, second, and third data, that the active constraint is associated with the first active fault and the second active fault; and presenting, via a graphical user interface (GUI), an indication of the active constraint in association with one or more of an indication of the first active fault or an indication of the second active fault.

G: The method of paragraph F, wherein: the system is a vehicle; and the active constraint is associated with one or more of: an automation level of the vehicle, a trajectory of the vehicle, motion directionality of the vehicle, a driving grade of the vehicle, a speed of the vehicle, a braking rate, a steering rate, or a power level of the vehicle.

H: The method of paragraph G, wherein the first active fault is associated with at least one of: a suspension component, a drive component, a brake component, a suspension component, a steering component, a body component, a user interface component, a power-storage component, a battery-charging component, a perception component of the vehicle, a localization component, or a planning component.

I: The method of any one of paragraphs F-H, wherein: the active constraint is a first active constraint; and the method further comprises: receiving fourth data indicating a second active constraint that limits the operational state of the system; and determining the first active constraint is more restrictive than the second active constraint, wherein, based on the first active constraint being more restrictive, the indication of the first active constraint is presented, instead of an indication of the second active constraint.

J: The method of any one of paragraphs F-I, wherein: the active constraint is a first active constraint, the indication of the first active fault is a first indication of the first active fault, and the operational state is a first operational state; and the method further comprises: receiving fourth data indicating a second active constraint that restricts a second operational state of vehicle; determining, based on the first and fourth data, that the first active fault is associated with the second active constraint; and presenting, via the graphical user interface and based on the first active fault being associated with the second active constraint, an indication of the second active constraint in association with a second indication of the first active fault.

K: The method of any one of paragraphs F-J, wherein the first data is determined based at least in part on one or more of: one or more first processors associated with the first component, a sensor associated with the first component, or one or more second processors associated with the system.

L: The method of any one of paragraphs F-K, wherein: the method further comprises determining, based on a fault prioritization criterion, that the first active fault includes a higher priority than the second active fault; the fault prioritization criterion includes one or more of: an operation of the second component being based at least in part on an operation of the first component; a relative position in a fault hierarchy, a time at which the first active fault was detected, a severity level associated with the first active fault, or a quantity of active constraints associated with the first active fault; and the indication of the first active fault indicates the higher priority.

M: The method of any one of paragraphs F-L, wherein: the system is a vehicle; the active constraint limits an automation level of the vehicle; and the method further comprises, presenting, via the GUI, an indication of a second active constraint associated with at least one of a permitted trajectory, a driving direction, a max power level, a max grade, or a max speed.

N: One or more non-transitory computer-readable storage media storing instructions that, when executed by one or more processors, cause the one or more processors to perform operations comprising: receiving first data indicating a first active fault associated with a first component of a vehicle; receiving second data indicating a second active fault associated with a second component of the vehicle; receiving third data indicating an active constraint, which limits an operational state of the vehicle; determining, based on the first, second, and third data, that the active constraint is associated with the first active fault and the second active fault; determining, based on a fault prioritization criterion, that the first active fault includes a higher priority than the second active fault; and presenting, via a graphical user interface (GUI), an indication of the active constraint in association with an indication of the active fault.

O: The one or more non-transitory computer-readable storage media of paragraph N, wherein the active constraint is associated with one or more of an automation level of the vehicle or a power level of the vehicle.

P: The one or more non-transitory computer-readable storage media of paragraph O, wherein the first active fault is associated with a suspension assembly of the vehicle.

Q: The one or more non-transitory computer-readable storage media of any one of paragraphs N-P, wherein: the active constraint is a first active constraint; and the operations further comprise: receiving fourth data indicating a second active constraint that limits the operational state of the vehicle; and determining the first active constraint is more restrictive than the second active constraint, wherein, based on the first active constraint being more restrictive, the indication of the first active constraint is presented, instead of an indication of the second active constraint.

R: The one or more non-transitory computer-readable storage media of any one of paragraphs N-Q, wherein: the active constraint is a first active constraint, the indication of the first active fault is a first indication of the first active fault, and the operational state is a first operational state; and the operations further comprise: receiving fourth data indicating a second active constraint that restricts a second operational state of vehicle; determining, based on the associations between faults and constraints, that the first active fault is associated with the second active constraint; and presenting, via the graphical user interface and based on the first active fault being associated with the second active constraint, an indication of the second active constraint in association with a second indication of the first active fault.

S: The one or more non-transitory computer-readable storage media of any one of paragraphs N-R, wherein determining the active constraint is associated with the first active fault and the second active fault is based on a directory of associations between faults and constraints.

T: The one or more non-transitory computer-readable storage media of any one of paragraphs N-S, wherein the fault prioritization criterion includes one or more of: an operation of the second component being based at least in part on an operation of the first component; a relative position in a fault hierarchy, a time at which the first active fault was detected, a severity level associated with the first active fault, or a quantity of active constraints associated with the first active fault.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
a first sensor associated with a first component of a first component type, which provides a first output;
a second sensor associated with a second component, wherein a second output of the second component is based at least in part on the first output;
one or more processors; and
one or more computer-readable media storing instructions that, when executed by the one or more processors, cause the autonomous vehicle to perform operations comprising:
determining a first active fault associated with the first component;
determining a second active fault associated with the second component;
receiving data indicating an active constraint which limits an operational state of the autonomous vehicle;
determining that the active constraint is associated with the first active fault and with the second active fault;
determining that the first active fault is a root cause of the active constraint, the determination associated with a confidence value indicating a likelihood that the first active fault is the root cause of the active constraint;
presenting, via a graphical user interface (GUI) and based on the first active fault being the root cause, an indication of the active constraint in association with an indication of the first active fault;
receiving a signal that the first active fault has been resolved;
based at least in part on the determination of the root cause and the signal, removing the active constraint limiting the operational state of the autonomous vehicle to put the autonomous vehicle in an updated operational state; and
controlling the autonomous vehicle in accordance with the updated operational state.

2. The autonomous vehicle of claim 1, wherein
the active constraint is a first active constraint,
the operations further comprising:
receiving second data indicating a second active constraint that limits the operational state of the autonomous vehicle; and
determining the first active constraint is more restrictive than the second active constraint, wherein, based on the first active constraint being more restrictive, the indication of the first active constraint is presented, instead of an indication of the second active constraint.

3. The autonomous vehicle of claim 1, wherein:
the active constraint is a first active constraint which restricts a level of automation, and the indication of the first active fault is a first indication of the first active fault,
the operations further comprising:
receiving second data indicating a second active constraint that restricts a maximum power mode executable by the autonomous vehicle;
determining, based at least in part on associations between faults and constraints, that the first active fault is associated with the second active constraint; and
presenting, via the graphical user interface, an indication of the second active constraint in association with a second indication of the first active fault.

4. The autonomous vehicle of claim 1, wherein:
the first component includes a suspension component,
the second component includes a perception component, and
the active constraint limits the autonomous vehicle to manual operations.

5. The autonomous vehicle of claim 1, wherein:
the active constraint restricts a level of automation of the autonomous vehicle; and
the operations further comprise presenting, via the GUI, an indication of a second active constraint associated with at least one of a permitted trajectory, a driving direction, a max power level, a max grade, or a max speed.

6. The autonomous vehicle of claim 1, the first sensor configured to monitor a first drive system component and the second sensor configured to monitor a second drive system component, wherein the determination that the first active fault is a root cause of the active constraint is further based at least in part on a hierarchy comprising the first sensor, the second sensor, the first drive system component, and the second drive system component.

7. A method comprising:
receiving first data indicating a first active fault associated with a first component of a system;
receiving second data indicating a second active fault associated with a second component of the system;
receiving third data indicating an active constraint, which limits an operational state of the system;
determining, based on the first data, the second data, and the third data, that the active constraint is associated with the first active fault and the second active fault;
determining that the first active fault is a root cause of the active constraint, the determination associated with a confidence value indicating a likelihood that the first active fault is the root cause of the active constraint;
presenting, via a graphical user interface (GUI), an indication of the active constraint in association with one or more of an indication of the first active fault or an indication of the second active fault;
receiving a signal that the first active fault has been resolved;
based at least in part on the determination of the root cause and the signal, removing the active constraint limiting the operational state of the system to put the system in an updated operational state; and
controlling the system in accordance with the updated operational state.

8. The method of claim 7, wherein: the system is a vehicle and the active constraint is associated with one or more of:
an automation level of the vehicle,
a trajectory of the vehicle,
a motion directionality of the vehicle, a driving grade of the vehicle,
a speed of the vehicle, a braking rate,
a steering rate, or
a power level of the vehicle.

9. The method of claim 8, wherein the first active fault is associated with at least one of:
a suspension component, a drive component,
a brake component,
a steering component,
a body component,
a user interface component, a power-storage component,
a battery-charging component, a perception component of the vehicle, a localization component, or
a planning component.

10. The method of claim 7, wherein:
the active constraint is a first active constraint; and the method further comprises:
receiving fourth data indicating a second active constraint that limits the operational state of the system; and
determining the first active constraint is more restrictive than the second active constraint, wherein, based on the first active constraint being more restrictive, the indication of the first active constraint is presented, instead of an indication of the second active constraint.

11. The method of claim 7, wherein:
the active constraint is a first active constraint, the indication of the first active fault is a first indication of the first active fault, and the operational state is a first operational state; and
the method further comprises:
receiving fourth data indicating a second active constraint that restricts a second operational state of the system;
determining, based on the first data and fourth data, that the first active fault is associated with the second active constraint; and
presenting, via the graphical user interface and based on the first active fault being associated with the second active constraint, an indication of the second active constraint in association with a second indication of the first active fault.

12. The method of claim 7, wherein the first data is determined based at least in part on one or more of:
one or more first processors associated with the first component, a sensor associated with the first component, or
one or more second processors associated with the system.

13. The method of claim 7, wherein:
the method further comprises determining, based on a fault prioritization criterion, that the first active fault includes a higher priority than the second active fault;
the fault prioritization criterion includes one or more of:
an operation of the second component being based at least in part on an operation of the first component;
a relative position in a fault hierarchy,
a time at which the first active fault was detected,
a severity level associated with the first active fault, or
a quantity of active constraints associated with the first active fault; and the indication of the first active fault indicates the higher priority.

14. The method of claim 7, wherein:
the system is a vehicle;
the active constraint limits an automation level of the vehicle; and
the method further comprises, presenting, via the GUI, an indication of a second active constraint associated with at least one of a permitted trajectory, a driving direction, a max power level, a max grade, or a max speed.

15. One or more non-transitory computer-readable storage media storing instructions that, when executed by one or more processors, cause the one or more processors to perform operations comprising:
receiving first data indicating a first active fault associated with a first component of a vehicle;
receiving second data indicating a second active fault associated with a second component of the vehicle;
receiving third data indicating an active constraint, which limits an operational state of the vehicle;
determining, based on the first data, the second data, and the third data, that the active constraint is associated with the first active fault and the second active fault;
determining that the first active fault is a root cause of the active constraint, the determination associated with a confidence value;
presenting, via a graphical user interface (GUI), an indication of the active constraint in association with an indication of the first active fault;
receiving a signal that the first active fault has been resolved;
based at least in part on the determination of the root cause and the signal, removing the active constraint limiting the operational state of the vehicle to put the vehicle in an updated operational state; and
controlling the vehicle in accordance with the updated operational state.

16. The one or more non-transitory computer-readable storage media of claim 15, wherein the active constraint is associated with one or more of an automation level of the vehicle or a power level of the vehicle.

17. The one or more non-transitory computer-readable storage media of claim 16, wherein the first active fault is associated with a suspension assembly of the vehicle.

18. The one or more non-transitory computer-readable storage media of claim 15, wherein:
the active constraint is a first active constraint; and the operations further comprise:
receiving fourth data indicating a second active constraint that limits the operational state of the vehicle; and
determining the first active constraint is more restrictive than the second active constraint, wherein, based on the first active constraint being more restrictive, the indication of the first active constraint is presented, instead of an indication of the second active constraint.

19. The one or more non-transitory computer-readable storage media of claim 15, wherein:
the active constraint is a first active constraint, the indication of the first active fault is a first indication of the first active fault, and the operational state is a first operational state,
the operations further comprising:
receiving fourth data indicating a second active constraint that restricts a second operational state of vehicle;
determining, based on associations between faults and constraints, that the first active fault is associated with the second active constraint; and
presenting, via the graphical user interface and based on the first active fault being associated with the second active constraint, an indication of the second active constraint in association with a second indication of the first active fault.

20. The one or more non-transitory computer-readable storage media of claim 15, further comprising determining that the first active fault is the root cause of the second active fault, the determination based at least in part on a fault prioritization criterion, including one or more of:
an operation of the second component being based at least in part on an operation of the first component;
a relative position in a fault hierarchy,
a time at which the first active fault was detected,
a severity level associated with the first active fault, or
a quantity of active constraints associated with the first active fault.

21. The one or more non-transitory computer-readable storage media of claim 20, wherein the determination that the first active fault is the root cause of the second active fault is associated with a confidence value indicating a likelihood that the first active fault is the root cause of the second active fault.

* * * * *